United States Patent
Takeyasu

(10) Patent No.: US 9,438,629 B2
(45) Date of Patent: Sep. 6, 2016

(54) SENSITIVE INFORMATION LEAKAGE PREVENTION SYSTEM, SENSITIVE INFORMATION LEAKAGE PREVENTION METHOD, AND COMPUTER-READABLE RECORDING MEDIUM

(71) Applicant: Hiroaki Takeyasu, Tokyo (JP)

(72) Inventor: Hiroaki Takeyasu, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 0 days.

(21) Appl. No.: 14/362,169

(22) PCT Filed: Oct. 4, 2012

(86) PCT No.: PCT/JP2012/075781
§ 371 (c)(1),
(2) Date: Jun. 2, 2014

(87) PCT Pub. No.: WO2013/080659
PCT Pub. Date: Jun. 6, 2013

(65) Prior Publication Data
US 2014/0325684 A1    Oct. 30, 2014

(30) Foreign Application Priority Data

Dec. 1, 2011  (JP) ................. 2011-263621

(51) Int. Cl.
*G06F 11/00* (2006.01)
*H04L 29/06* (2006.01)
*H04L 9/32* (2006.01)

(52) U.S. Cl.
CPC ............ *H04L 63/20* (2013.01); *H04L 9/3271* (2013.01); *H04L 63/0209* (2013.01); *H04L 63/0245* (2013.01); *H04L 63/08* (2013.01); *H04L 63/10* (2013.01)

(58) Field of Classification Search
CPC ........... G06F 21/36; G06F 2221/2103; G06F 21/6218; G06F 17/30867; G06F 21/10; G06F 21/31; G06F 21/6245; G06Q 20/322; G06Q 20/325; G06Q 20/4014; G06Q 20/382; G06Q 20/40; G06Q 10/105; G06Q 30/0201; G06Q 50/22; G06Q 20/1235; G06Q 20/202; G06Q 30/0185; G09C 1/04; H04L 2463/102; H04L 63/08; H04L 63/1408; H04L 9/3271; H04L 63/10; G06K 19/06018; G06K 19/06037; G06K 19/10
USPC ....................................... 726/7, 29
See application file for complete search history.

(56) References Cited

U.S. PATENT DOCUMENTS

2006/0253445 A1* 11/2006 Huang et al. .............. 707/9
2010/0115465 A1*  5/2010 Lu et al. ................ 715/810
2012/0003923 A1*  1/2012 Pazos et al. ............ 455/3.06

FOREIGN PATENT DOCUMENTS

CN     101657822 A     2/2010
JP     2000-174807 A   6/2000

(Continued)

OTHER PUBLICATIONS

International Search Report for PCT Application No. PCT/JP2012/075781, mailed on Dec. 4, 2012.

(Continued)

*Primary Examiner* — Kambiz Zand
*Assistant Examiner* — Abiy Getachew

(57) ABSTRACT

A client device (100) determines whether or not access is allowed, based on security levels that are set for an application program and data held in a server device (200), and performs authentication with the server device (200) based on a challenge code generated using packet data from the application program. The server device (200), when the challenge code is transmitted thereto, transmits a preset response code to the client device (100), and permits access by the client device (100) if the server device (200) receives a set response to the response code from the client device (100).

9 Claims, 14 Drawing Sheets

(56) References Cited

FOREIGN PATENT DOCUMENTS

| JP | 2002-182983 A | 6/2002 |
| JP | 2008-257519 A | 10/2008 |
| JP | 2009-151401 A | 7/2009 |
| WO | 2008/132968 A1 | 11/2008 |

OTHER PUBLICATIONS

Examination report and search report in TW counterpart patent application 101139572, dated Feb. 17, 2016.

\* cited by examiner

Fig.2

Label assignment list    704

| Process ID | Label |
|---|---|
| 123 | Sensitive |
| 456 | General |
| ... | ... |

Fig.4

Folder label list 701

| Folder name | Folder label |
|---|---|
| Good Server 1st /Private | Sensitive |
| Good server 1st /Public | General |
| ... | ... |

Fig.5

Authenticated client list    703

| Client IP address | Port number | Authentication status |
|---|---|---|
| 192.168.1.2 | 137 | Authenticated |
| 192.168.3.4 | 80 | First |
| 192.168.1.3 | 137 | Second |
| 192.168.1.4 | 137 | Third |
| ... | ... | ... |

Fig.7

Accessibility determination criteria

|  |  | Server side | |
| --- | --- | --- | --- |
|  |  | Sensitive folder 206 | General folder 205 |
| Client side | Sensitive application 206 | Access permitted | Read only permitted |
| | General application 105 | Access prohibited | Access permitted |

Fig.11

Authenticated server list

| Server IP address | Server name | Label | Authentication status |
| --- | --- | --- | --- |
| 192.168.1.2 | File server 1 | Sensitive | Authenticated |
| 192.168.3.4 | Web server 1 | General | Authenticated |
| ... | ... | ... | ... |

Fig.12

Authenticated client list

| Client IP address | Port number | Authentication status | Remaining valid time |
|---|---|---|---|
| 192.168.1.2 | 137 | Authenticated | 56 |
| 192.168.3.4 | 80 | Authenticated | 78 |
| ... | ... | ... | ... |

SENSITIVE INFORMATION LEAKAGE PREVENTION SYSTEM, SENSITIVE INFORMATION LEAKAGE PREVENTION METHOD, AND COMPUTER-READABLE RECORDING MEDIUM

This application is a National Stage Entry of PCT/JP2012/075781 filed on Oct. 4, 2012, which claims priority from Japanese Application 2011-263621 filed on Dec. 1, 2011, the contents of all which are incorporated herein by reference, in their entirety.

TECHNICAL FIELD

The present invention relates to a sensitive information leakage prevention system, a sensitive information leakage prevention method, and a computer-readable recording medium that stores a program for realizing the sensitive information leakage prevention system and the sensitive information leakage prevention method.

BACKGROUND ART

For example, in an organization such as a company or a governmental office, the responsibility to be borne and the authority that can be exercised by a constituent member of the organization differs depending on his/her position. Accordingly, reading and writing of resources, i.e., access to resources, such as materials or information sources held in the organization need to be controlled in accordance with the position of each constituent member. An MLS system (Multilevel Security System) is known as a system for controlling access to resources.

In the MLS system, a security level that indicates the degree of sensitivity is assigned to users who access resources, as well as to resources which are access targets. User access of resources by the users is controlled in accordance with the security level assigned to the users and the security level of the resources. For example, Patent Document 1 discloses a technique for realizing the MLS system at the time of network access between a client and a server.

In the system disclosed in Patent Document 1, a kernel in a transmission-side client controls operation of input/output functions, memories, processes, and execution programs. The kernel also creates a port identifier by combining a security level and a port number. The port identifier is inserted into a protocol area of an IP (Internet Protocol) header of an IP packet. The IP header is transmitted to a reception-side server after having data attached thereto.

A reception-side kernel in the reception-side server acquires a port identifier from the received IP header, and thereafter extracts the security level and the port number. If the port corresponding to the extracted port number is accessible at the extracted security level, the reception-side kernel releases the port and realizes network access in accordance with the security level.

CITATION LIST

Patent Document

Patent Document 1: JP 2000-174807A

DISCLOSURE OF THE INVENTION

Problem to be Solved by the Invention

As described above, in the system disclosed in Patent Document 1, the client needs to insert the port identifier in the IP header of the IP packet. Also, the server needs to extract the port identifier from the IP header. Accordingly, in order to insert and extract the port identifier, it is necessary to modify the operating system (OS) of the client and the server so as to be able to transmit and receive IP packets.

An exemplary object of the present invention is to resolve the foregoing problem and provide a sensitive information leakage prevention system, a sensitive information leakage prevention method, and a computer-readable recording medium with which network access can be controlled between a client device and a server device in accordance with a security level, without modifying an operating system.

Means for Solving the Problem

To achieve the above-stated object, a sensitive information leakage prevention system according to one aspect of the present invention is a sensitive information leakage prevention system for preventing leakage of sensitive information between a client device and a server device, including:

a client device configured to execute an application program; and a server device configured to hold data to be used by the application program, wherein the client device determines whether or not access by the application program is allowed, based on a security level that is set for the application program and a security level that is provided to data held in the server device, and transmits, if it is determined that access is allowed, a challenge code that is generated using packet data from the application program to the server device and requests authentication, and the server device transmits, when the challenge code is transmitted thereto, a preset response code to the client device, determines that authentication is successful if the server device receives a set response to the response code from the client device, and thereafter permits access by the client device.

To achieve the above-stated object, a sensitive information leakage prevention method according to one aspect of the present invention is a method for preventing leakage of sensitive information between a client device that executes an application program and a server device that holds data to be used by the application program, the method including:

a step (a) of the client device determining whether or not access by the application program is allowed, based on a security level that is set for the application program and a security level that is provided to the data held in the server device;

a step (b) of the client device transmitting, if it is determined that access is allowed, a challenge code that is generated using packet data from the application program to the server device and requesting authentication;

a step (c) of the server device transmitting, when the challenge code is transmitted thereto, a preset response code to the client device, and determining that authentication is successful if a set response to the response code is received from the client device; and a step (d) of the server device permitting access by the client device if it is determined that authentication is successful.

Furthermore, to achieve the above-stated object, a first computer-readable recording medium according to one aspect of the present invention is a computer-readable recording medium storing a program for accessing, by a computer, data held in a server device, the program containing a command for causing the computer to execute:

a step (a) of determining whether or not access by the application program is allowed, based on a security level that is set for the application program used in the computer and a security level that is provided to the data held in the server device; and a step (b) of transmitting, if it is determined in the step (a) that access is allowed, a challenge code that is generated using packet data from the application program to the server device and requesting authentication.

Furthermore, to achieve the above-stated object, a second computer-readable recording medium according to one aspect of the present invention is a computer-readable recording medium storing a program for determining, by a computer, whether or not a client device is allowed to access data to be used by an application program that is executed by the client device, the program containing a command for causing the computer to execute:

a step (a) of transmitting a preset response code to the client device if a challenge code that is generated using packet data from the application program is transmitted for requesting authentication from the client device;

a step (b) of determining that authentication is successful if a set response to the response code is received from the client device after the step (a) is executed; and a step (c) of permitting access by the client device if it is determined in the step (b) that authentication is successful.

Effects of the Invention

As described above, according to the present invention, network access can be controlled between a client device and a server device in accordance with a security level, without modifying an operating system.

BRIEF DESCRIPTION OF THE DRAWINGS

FIG. 2 is a diagram showing an exemplary label assignment list according to Embodiment 1 of the present invention.

FIG. 4 is a diagram showing an exemplary folder label list according to Embodiment 1 of the present invention.

FIG. 5 is a diagram showing an exemplary authenticated client list according to Embodiment 1 of the present invention.

FIG. 7 is a diagram showing exemplary accessibility determination criteria according to Embodiment 1 of the present invention.

FIG. 11 is a diagram showing an exemplary authenticated server list used in Embodiment 1 of the present invention.

FIG. 12 is a diagram showing another exemplary authenticated client list according to Embodiment 1 of the present invention.

DESCRIPTION OF EMBODIMENTS

Embodiment 1

A sensitive information leakage prevention system, a sensitive information leakage prevention method, and a program according to Embodiment 1 of the present invention will be described below with reference to FIGS. 1 to 12.

System Configuration

Figure 1:
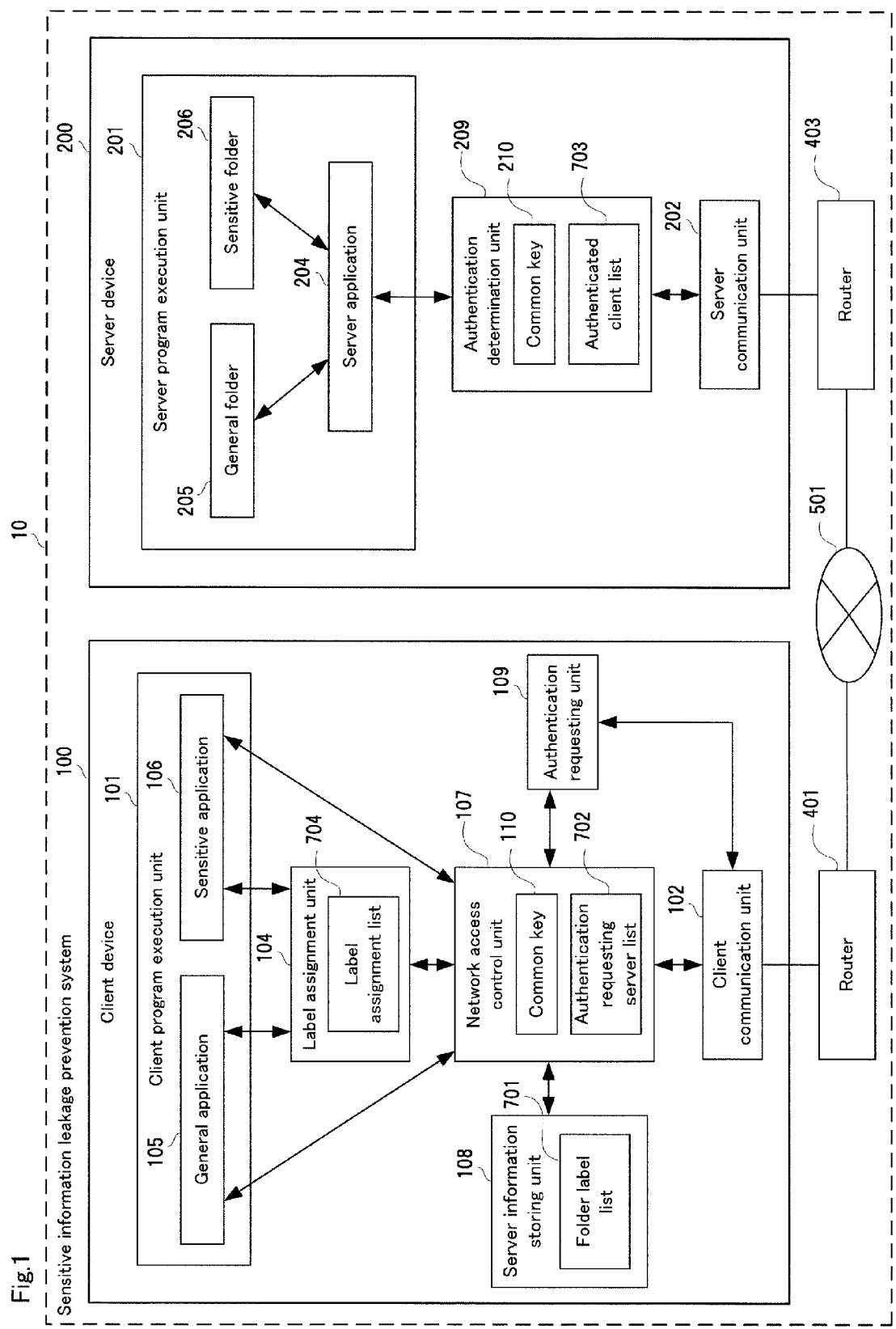
FIG. 1 is a block diagram showing a configuration of a sensitive information leakage prevention system according to Embodiment 1 of the present invention.

First, a configuration of a sensitive information leakage prevention system 10 according to Embodiment 1 will be described using FIG. 1. FIG. 1 is a block diagram showing a configuration of the sensitive information leakage prevention system according to Embodiment 1 of the present invention.

The sensitive information leakage prevention system 10 according to the present embodiment shown in FIG. 1 is for preventing leakage of sensitive information between a client device and a server device. As shown in FIG. 1, the sensitive information leakage prevention system 10 includes a client device 100 that executes an application program, and a server device 200 that holds data to be used by the application program. The client device 100 and the server device 200 are connected by a network 501. Note that although one client device 100 and one server device 200 are shown in the example in FIG. 1, the number of client devices 100 and server devices 200 is not limited in Embodiment 1.

The client device 100 determines whether or not access by the application program is allowed, based on a security level that is set for the application program and a security level that is provided to the data held in the server device 200. If the client device 100 determines that access is allowed, the client device 100 transmits, to the server device 200, a challenge code that is generated using packet data from the application program, and requests authentication.

The server device 200, when the challenge code is transmitted thereto, transmits a preset response code to the client device 100. If the server device 200 receives a set response to the response code from the client device 100, the server device 200 determines that authentication is successful, and thereafter permits access by the client device 100.

Thus, in Embodiment 1, the client device 100 determines whether or not access by the application program is allowed, based on the security level that is set for the application program and the security level that is provided to the data. The client device 100 performs authentication for the server device 200 only after a condition regarding about the security level is satisfied, and if authentication is successful, the server device 200 permits access from the client device 100 without requesting addition of an identifier or the like to a packet.

Therefore, according to Embodiment 1, network access can be controlled between the client device 100 and the server device 200 in accordance with the security level, without modifying the operating system.

The configuration of the sensitive information leakage prevention system 10 according to Embodiment 1 will now be described in more detail using FIGS. 2 to 5, in addition to FIG. 1. As shown in FIG. 1, in the present embodiment, the client device 100 is connected to the network 501 via a router 401. Similarly, the server device 200 is also connected to the network 501 via a router 403.

In Embodiment 1, both the client device 100 and the server device 200 are constituted by computers. Note that the specific configuration of the computers will be described later.

Configuration of Client Device

As shown in FIG. 1, in Embodiment 1, the client device 100 includes a client program execution unit 101, a client communication unit 102, a label assignment unit 104, a network access control unit 107, a server information storing unit 108, and an authentication requesting unit 109. Among them, the client communication unit 102 is configured by an NIC (Network Interface Card), for example.

The client program execution unit 101 executes an application program (hereinafter referred to as an "application") that is installed in the client device 100. In Embodiment 1, as shown in FIG. 1, a general application 105 and a sensitive application 106 are installed in the client device 100.

In Embodiment 1, the installed applications are distinguished as being "a general application 105" or "a sensitive application 106", based on labels that are assigned by the label assignment unit 104, which will be described later. For example, an application assigned a "general label" is defined as the general application 105, and an application assigned a "sensitive label" is defined as the sensitive application 106. Note that the installed applications may be generally used applications such as an editor and a web browser.

The label assignment unit 104 assigns a label that indicates a preset security level, such as the aforementioned sensitive label or general label, to each application. The label assignment unit 104 then stores a correspondence relationship between the applications and the assigned labels in a label assignment list 704.

After the labels are assigned by the label assignment unit 104, transmission and reception of information from an application with the sensitive label to an application with the general label are prohibited within the client device 100. A specific example of the label assignment list 704 will now be described using FIG. 2.

FIG. 2 is a diagram showing an exemplary label assignment list according to Embodiment 1 of the present invention. As shown in FIG. 2, a combination of a process ID and a label is registered for each process in the label assignment list 704. The process ID is an identifier for uniquely specifying an application that is currently running. In the example in FIG. 2, the label assignment list 704 has a list structure in which combinations are added and deleted in the downward direction in FIG. 2, but the list structure is not limited thereto.

In the label assignment list 704, an identifier other than the process ID, e.g., a full path of an application may be registered as the identifier for uniquely specifying the application that is currently running. Furthermore, in the label assignment list 704, a label may be assigned for each application, rather than for each process.

The label is not limited to the character string "sensitive" or "general", and may alternatively be a numeric value or another character string. For example, the label may be a numeric value such as 1 or 2, or a character string such as "sensitive group 1" or "sensitive group 2". The list structure of the label assignment list 704 is not limited to a one-dimensional list structure, and may be a structure using a hash table.

The network access control unit 107 monitors network access by the general application 105 and the sensitive application 106. Upon network access by any application being started, the network access control unit 107 determines whether or not access is allowed, in accordance with the label assigned to this application and the label of an access destination folder.

The network access control unit 107 controls network access by determining whether or not access is allowed, based on the labels. At this time, the network access control unit 107 acquires the label assigned to the application, from the label assignment unit 104. The network access control unit 107 also acquires the label that is set for the access destination, from the server information storing unit 108. Note that the label that is set for the access destination refers to the label that is set for a data folder (205 and 206) held in the server device 200, which will be described later.

Figure 3:
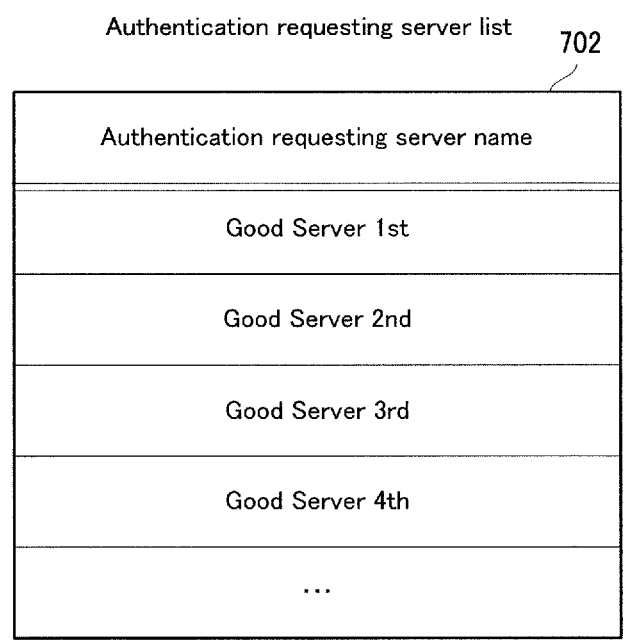
FIG. 3 is a diagram showing an exemplary authentication requesting server list according to Embodiment 1 of the present invention.

The network access control unit 107 has a list (hereinafter referred to as an "authentication requesting server list") 702 of serves that request authentication (specifically, servers provided with an authentication determination unit 209). FIG. 3 is a diagram showing an exemplary authentication requesting server list according to Embodiment 1 of the present invention. The network access control unit 107 determines whether or not the access destination server needs authentication, based on the authentication requesting server list 702 shown in FIG. 3. Further, the network access control unit 107 holds a common key 110 that is used in encryption at the time of authentication.

The server information storing unit 108 stores information (hereinafter referred to as a "folder label list") 701 for specifying the labels that are set for the folders (205 and 206) held in the server device 200. FIG. 4 is a diagram showing an exemplary folder label list according to Embodiment 1 of the present invention.

As described above, upon the name of an access destination folder being designated by the network access control unit 107, the server information storing unit 108 searches the folder label list shown in FIG. 4, specifies the label that is set for the designated folder, and notifies the network access control unit 107 of the specified label.

The authentication requesting unit 109 authenticates that the network access control unit 107 is installed in the client device 100 and is operating correctly, and transmits the result to the authentication determination unit 209 in the server device. The network access control unit 107 is notified of the authentication result.

Specifically, if the network access control unit 107 determines that access to the server device 200 by the application 105 or 106 is allowed, the authentication requesting unit 109 generates a challenge code using packet data from the application. The authentication requesting unit 109 then transmits the generated challenge code to the server device 200 and requests authentication.

Configuration of Server Device

As shown in FIG. 1, in Embodiment 1, the server device 200 includes a server program execution unit 201, an authentication determination unit 209, and a server communication unit 202. Among them, the server communication unit 202 is configured by an NIC (Network Interface Card), for example.

The server program execution unit 201 executes an application (hereinafter referred to as a "server application") that is installed in the server device 200. In the server program execution unit 201, a general folder 205 in which general information is stored and a sensitive folder 206 in which sensitive information is stored are provided.

Upon the authentication requesting unit 109 in the client device 100 transmitting the challenge code, the authentication determination unit 209 transmits a preset response code to the client device 100. At this time, in Embodiment 1, the authentication determination unit 209 determines whether or not the transmitted challenge code satisfies a set condition, and transmits the response code if the challenge code satisfies the set condition.

Thereafter, if the authentication determination unit 209 receives a set response to the response code from the client device 100 (e.g., if the same code as the challenge code is transmitted from the client device 100), the authentication determination unit 209 determines that authentication is successful. The authentication determination unit 209 can perform the above-described authentication multiple times.

The authentication determination unit 209 also holds a common key 210 which is the same as the common key 110 held by the network access control unit 107. The authentication determination unit 209 executes encryption of the response code and decryption of the challenge code, using the common key 210.

If the authentication determination unit 209 determines that authentication is successful, the authentication determination unit 209 permits access by the client device 100, and registers the client device 100 regarding which the authentication determination unit 209 allows authentication in the authenticated client list 703. FIG. 5 is a diagram showing an exemplary authenticated client list according to Embodiment 1 of the present invention.

As shown in FIG. 5, if authentication is successful in the present embodiment, the authentication determination unit 209 registers, in the authenticated client list 703, the IP address (hereinafter referred to as the "client IP address") used by the client device 100 that was successfully authenticated, the port number used by the router 401, and authentication status of the client device 100. A numeric values or a character string such as "authenticated", "first authentication", or "second authentication" is registered in each column of the authentication status. Note that in the example in FIG. 5, character strings are registered in the authentication status columns for the sake of ease of understanding.

Furthermore, the authentication determination unit 209 references the authenticated client list 703 and monitors network access to the server application 204. The authentication determination unit 209 prohibits access from client devices that are not registered in the authenticated client list shown in FIG. 5.

As described above, with the client device 100 in which the network access control unit 107 is installed, access control is performed in accordance with the labels in the client device, and the client device is the subject of authentication in the server device 200. On the other hand, with a client device in which the network access control unit 107 is not installed, access control cannot be performed in accordance with the labels in the client device, and accordingly the server device 100 does not perform authentication and prohibits all communication.

System Operation

Next, the operation of the sensitive information leakage prevention system 10 according to Embodiment 1 of the present invention will be described using FIGS. 6 to 10.

Note that in the following description, FIGS. 1 to 5 will be referred to as appropriate. Furthermore, in Embodiment 1, a sensitive information leakage prevention method is implemented by operating the sensitive information leakage prevention system 10. Accordingly, the following description of the operation of the sensitive information leakage prevention system 10 will replace the description of the sensitive information leakage prevention method according to Embodiment 1.

Overall Operation

Figure 6:
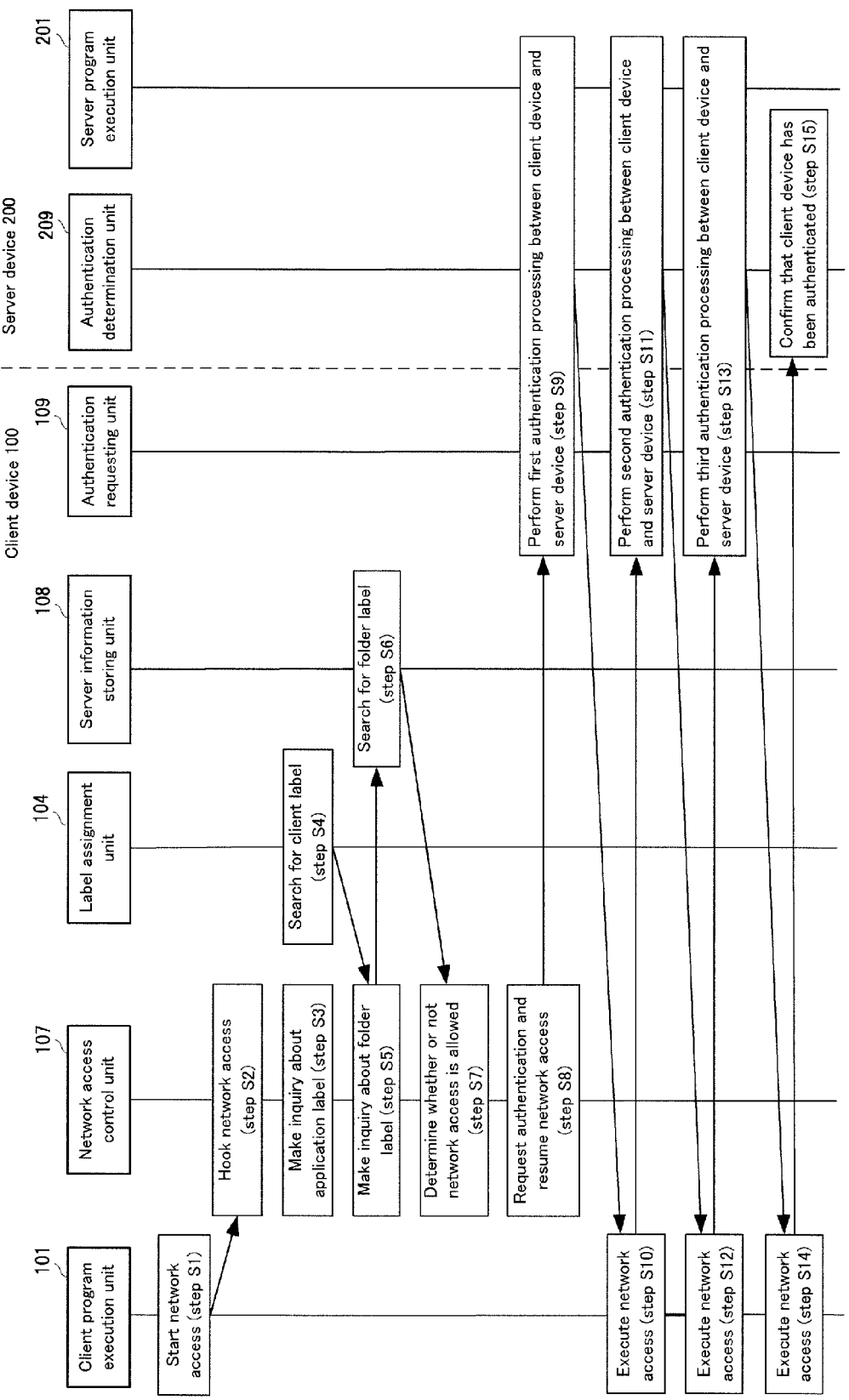
FIG. 6 is a sequence chart showing operation of the entire sensitive information leakage prevention system according to Embodiment 1 of the present invention.

First, the operation of the entire sensitive information leakage prevention system 10 according to Embodiment 1 will be described in detail with reference to FIG. 6. FIG. 6 is a sequence chart showing operation of the entire sensitive information leakage prevention system according to Embodiment 1 of the present invention.

Initially, in the client device 100, the client program execution unit 101 executes the general application 105 or the sensitive application 106, and the executed application starts network access (step S1).

The network access control unit 107 monitors network access by the general application 105 and the sensitive application 106. Accordingly, upon step S1 being executed, the network access control unit 107 hooks the network access (step S2).

Next, the network access control unit 107 makes an inquiry about the label of the application that is attempting to perform the network access, to the label assignment unit 104 (step S3). The label assignment unit 104 thereby searches the label assignment list 704 (see FIG. 2) to specify the label of the application, and notifies the network access control unit 107 of the specified label (step S4).

Next, the network access control unit 107 makes an inquiry about the label of the folder in the server device 200 that the application is attempting to access, to the server information storing unit 108 (step S5). The server information storing unit 108 thereby searches the folder label list 701 (see FIG. 4) to specify the label of the access destination folder, and notifies the network access control unit 107 of the specified label (step S6).

Next, the network access control unit 107, after finishing acquisition of the label of the application and the label of the access destination folder, determines whether or not access is allowed, based on criteria for accessibility determination that are shown in FIG. 7 (step S7). FIG. 7 is a diagram showing exemplary criteria for accessibility determination according to Embodiment 1 of the present invention.

Specifically, the network access control unit 107 permits access if the application has the sensitive label and the access destination folder also has the sensitive label, as shown in FIG. 7. The network access control unit 107 also permits access if the application has the general label and the access destination folder also has the general label, as shown in FIG. 7.

On the other hand, the network access control unit 107 prohibits access if the application has the general label and the access destination folder has the sensitive label, as shown in FIG. 7. The network access control unit 107 permits only reading if the application has the sensitive label and the access destination folder has the general label, as shown in FIG. 7.

Next, if the network access control unit 107 determines in step S7 that access is allowed, the network access control unit 107 resumes the network access that was stopped in step S2, and starts communication with the server device 200

(step S8). Specifically, the network access control unit 107 gives the authentication requesting unit 109 an instruction to request authentication.

Next, upon the network access control unit 107 giving the authentication request instruction, the authentication requesting unit 109 performs authentication processing between the server device 200 and the authentication determination unit 209 (step S9). In step S9, if the authentication is successful, the authentication determination unit 209 acquires the IP address and the port number of the client device 100 that are recognized by the server device, and registers the acquired IP address and the port number in the authenticated client list 703 (see FIG. 5). Note that the details of step S9 will be described later using FIG. 8.

If the authentication is successful in step S9, the server application 204 in the server device 200 transmits a code indicating that the authentication in step S9 has been allowed to the client device 100. Thus, in the client program execution unit 101, the application (105 or 106) executes second network access to the server device 200 (step S10).

Next, upon step S10 being executed, the authentication requesting unit 109 performs second authentication processing between the server device 200 and the authentication determination unit 209 (step S11). Note that the details of step S11 will be described later using FIG. 9.

If authentication is successful in step S11, the server application 204 in the server device 200 transmits a code indicating that the authentication in step S11 has been allowed to the client device 100. Thus, in the client program execution unit 101, the application (105 or 106) executes third network access to the server device 200 (step S12).

Next, upon step S12 being executed, the authentication requesting unit 109 performs third authentication processing between the server device 200 and the authentication determination unit 209 (step S13). Note that the details of step S13 will be described later using FIG. 10. If authentication is successful in step S13, the authentication determination unit 209 registers the client device 100 as "authenticated" in the authenticated client list (see FIG. 5).

If authentication is successful in step S13, the server application 204 in the server device 200 transmits a code indicating that the authentication in step S13 has been allowed to the client device 100. In this case, since access is permitted, in the client program execution unit 101, the application (105 or 106) continues network access to the server device 200 (step S14).

Next, in the server device 200, the authentication determination unit 209 confirms that the client device 100 has been authenticated, and permits access to the folder (step S15). Note that if authentication failed in any of step S9, step S11, and step S13, or if access is received from a client device in which the network access control unit 107 is not installed, the server device 200 prohibits access by the client from which access was received, for the reason that the client device is not registered in the authenticated client list (see FIG. 5).

Authentication Processing

Next, authentication processing (steps S9, S11, S13) shown in FIG. 6 that is performed three times will be described in detail using FIGS. 8 to 10. Note that although the authentication processing is performed three times in Embodiment 1, the number of times authentication processing is performed is not particularly limited in Embodiment 1. The authentication processing may be performed once, twice, or four or more times.

Figure 8:
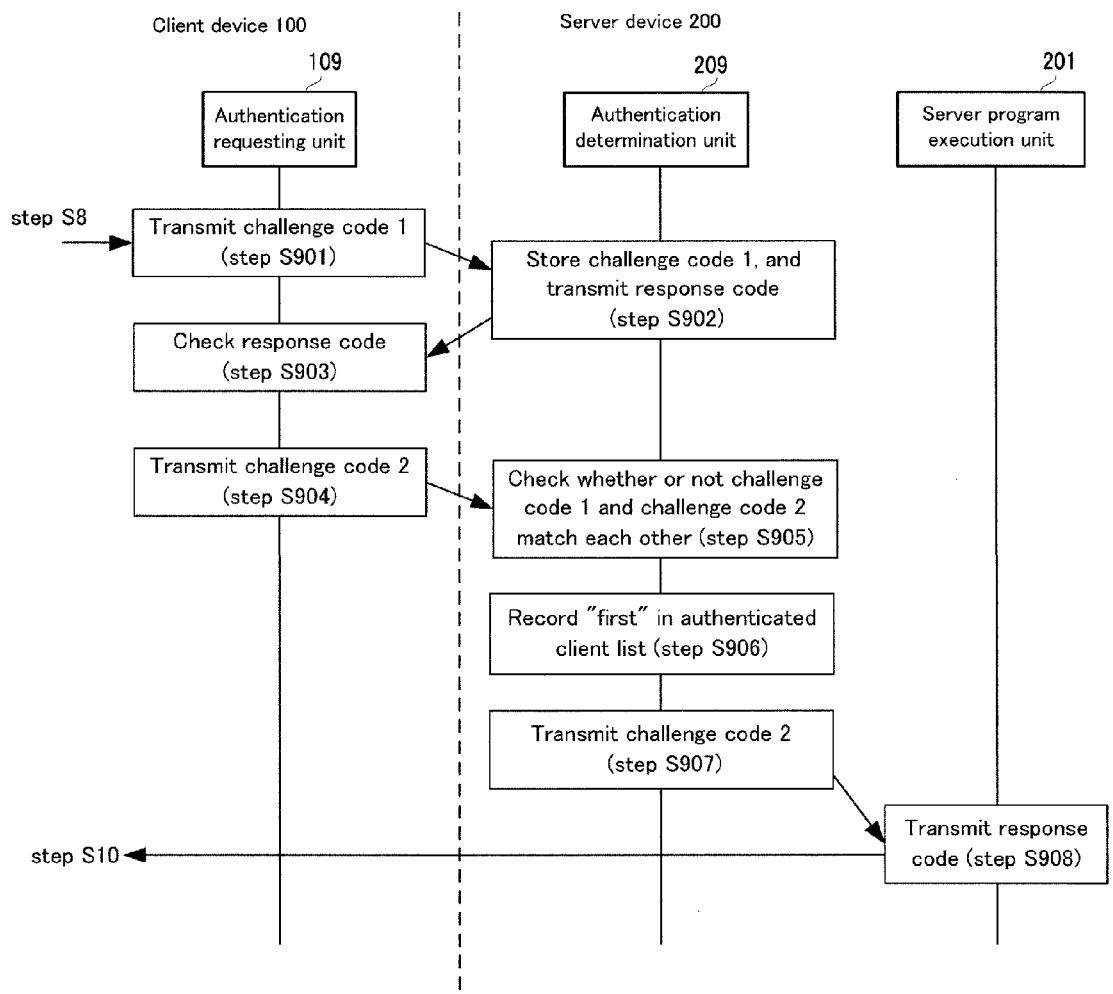
FIG. 8 is a sequence chart showing operation at the time of first authentication processing in the sensitive information leakage prevention system according to Embodiment 1 of the present invention.

FIG. 8 is a sequence chart showing operation at the time of the first authentication processing in the sensitive information leakage prevention system according to Embodiment 1 of the present invention. As shown in FIG. 8, step S9 shown in FIG. 6 is constituted by steps S901 to S908.

As shown in FIG. 8, initially, the authentication requesting unit 109 creates a challenge code 1 and transmits the challenge code 1 to the authentication determination unit 209 (step S901). In step S901, the authentication requesting unit 109 creates the challenge code 1 using packet data from an application that executes network access. At this time, the authentication requesting unit 109 adds an identifier for identifying the client device 100 to the challenge code 1.

The packet data used for generating the challenge code 1 may be data that the application is actually scheduled to transmit, or may be data that is prepared in advance for authentication by the application. The packet data may also be a random number generated by the application in the client device.

Furthermore, in step S901, the authentication requesting unit 109 encrypts the created challenge code 1 using the common key 110. The encryption format in this case is set as appropriate, giving consideration to required security strength, processing speed, and the like. For example, in the case where a DES128 method using a common key is employed, influence on the processing speed can be reduced, but the security strength deteriorates. Note that the above-described encryption is executed for all challenge codes, which will be described below.

Next, the authentication determination unit 209, upon receiving the challenge code 1 transmitted from the authentication requesting unit 109, decrypts and stores the received challenge code 1. Then, the authentication determination unit 209 determines whether or not the challenge code 1 satisfies a set condition, e.g., whether the challenge code 1 is data that can be recognized by the server application 204. If a result of the determination is that the challenge code 1 satisfies the set condition, the authentication determination unit 209 generates a response code and transmits the response code to the authentication requesting unit 109 (step S902).

Also in step S902, the authentication determination unit 209 encrypts the generated response code using the common key 210. The encryption format in this case is set as appropriate, giving consideration to necessary security strength, processing speed, and the like. Note that the above-described encryption is executed for all response codes, which will be described below.

Furthermore, the response code may be a hash value that is obtained by applying a hash function such as SHA1 to the common key 210 and the challenge code 1, for example. Alternatively, the response code may be a preset code.

Next, the authentication requesting unit 109 checks the received response code (step S903). For example, if the response code is the aforementioned hash value, the authentication requesting unit 109 calculates a hash value using the same hash function as that for the common key 110 and the challenge code 1, and checks whether or not the two hash values match each other.

Then, if a result of the check is that there is no problem, the authentication requesting unit 109 transmits a challenge code 2 to the authentication determination unit 209 (step S904). Note that in Embodiment 1, the challenge code 1 transmitted in step S901 and the challenge code 2 transmitted in step S904 are the same code.

Next, the authentication determination unit 209 compares the challenge code 1 received in step S902 with the newly received challenge code 2, and checks whether or not the two challenge codes match each other (step S905).

If a result of the check in step S905 is that the two challenge codes match, the authentication determination unit 209 registers, as an authentication result, the client IP address and the port number of the client device 100 in the authenticated client list (see FIG. 5), and further records "first" in the authentication status column (step S906).

Next, if authentication is successful, the authentication determination unit 209 transmits the challenge code 2 received in step S905 to the server application 204 (step S907).

Next, the server application 204 transmits the response code to the client device 100 (step S908). Thus, step S9 shown in FIG. 6 ends. Note that the response code in step S908 may be the same as the response code used in step S902, or may be a separately created response code.

Figure 9:
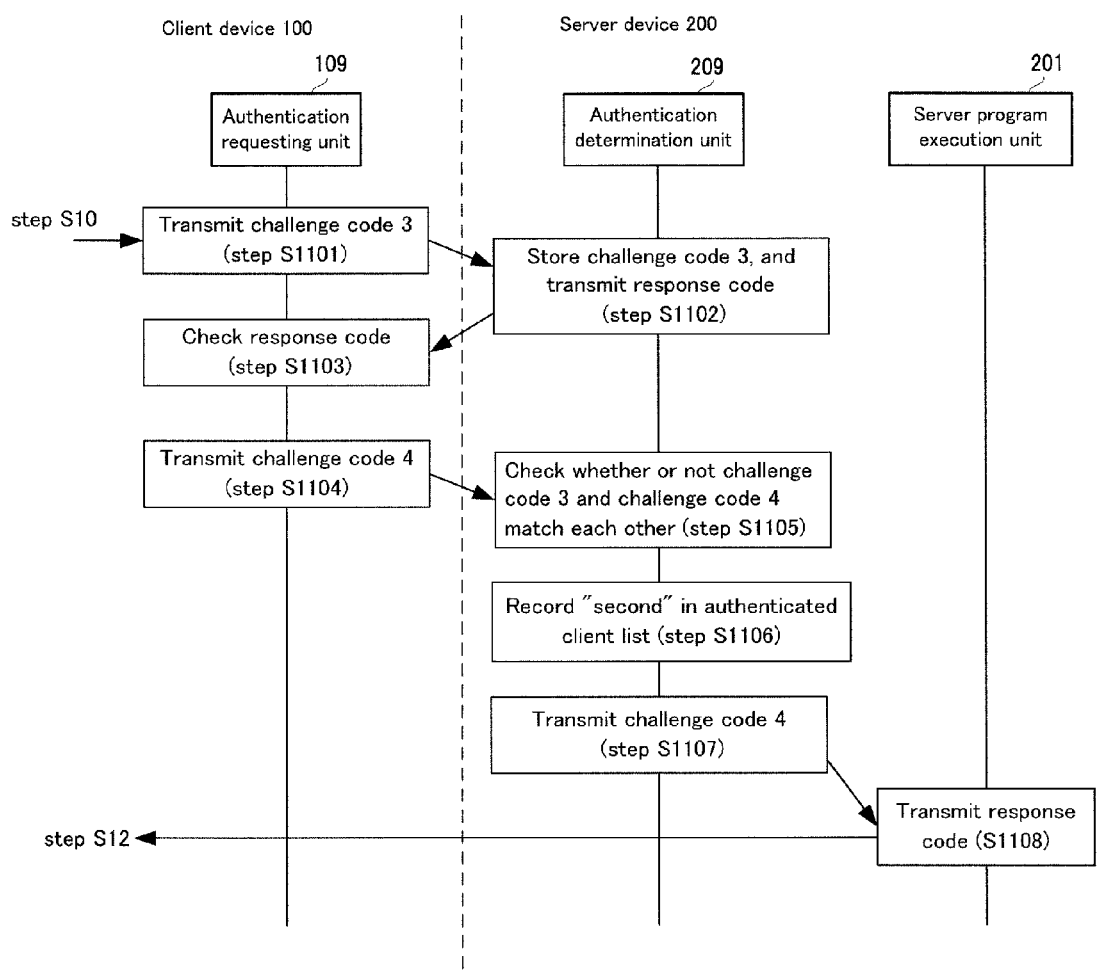
FIG. 9 is a sequence chart showing operation at the time of second authentication processing in the sensitive information leakage prevention system according to Embodiment 1 of the present invention.

FIG. 9 is a sequence chart showing operation at the time of the second authentication processing in the sensitive information leakage prevention system according to Embodiment 1 of the present invention. As shown in FIG. 9, step S11 shown in FIG. 6 is constituted by steps S1101 to S1108.

As shown in FIG. 9, initially, the authentication requesting unit 109 creates a challenge code 3 and transmits the challenge code 3 to the authentication determination unit 209 (step S1101). The challenge code 3 may be the data transmitted from the server device 200 in step S9. The challenge code 3 may also be a random number generated by the application in the client device.

Next, the authentication determination unit 209, upon receiving the challenge code 3 transmitted from the authentication requesting unit 109, stores the received challenge code 3. Then, the authentication determination unit 209 determines whether or not the challenge code 3 satisfies a set condition, e.g., determines whether or not the challenge code 3 matches the response code transmitted in step S908. If a result of the determination is that the challenge code 3 satisfies the set condition, the authentication determination unit 209 generates a response code and transmits the response code to the authentication requesting unit 109 (step S1102). Note that the response code in this case may also be a response code similar to that in step S902.

Next, the authentication requesting unit 109 checks the received response code (step S1103). Then, if a result of the check is that there is no problem, the authentication requesting unit 109 transmits a challenge code 4 to the authentication determination unit 209 (step S1104). Note that in Embodiment 1, the challenge code 3 transmitted in step S1101 and the challenge code 4 transmitted in step S1104 are the same code.

Next, the authentication determination unit 209 compares the challenge code 3 received in step S1102 with the newly received challenge code 4, and checks whether or not the two challenge codes match each other (step S1105).

If a result of the check in step S1105 is that the two challenge codes match, the authentication determination unit 209 records "second" in the authentication status column in the corresponding record in the authenticated client list (see FIG. 5) (step S1106).

Next, if the authentication is successful, the authentication determination unit 209 transmits the challenge code 4 received in step S1105 to the server application 204 (step S1107).

Next, the server application 204 transmits the response code to the client device 100 (step S1108). Thus, step S11 shown in FIG. 6 ends. Note that the response code in step S1108 may be the same as the response code used in step S1102, or may be a separately created response code.

Figure 10:
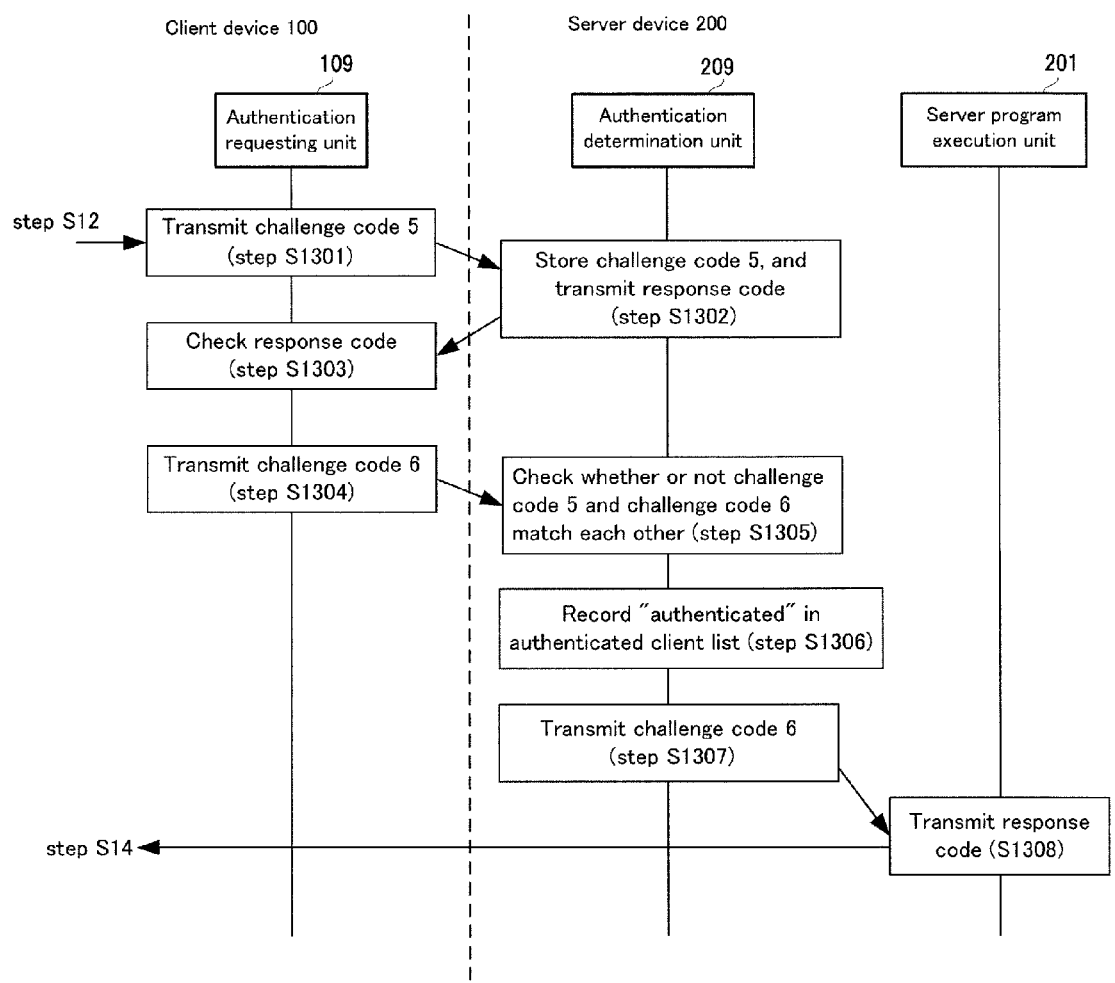
FIG. 10 is a sequence chart showing operation at the time of third authentication processing in the sensitive information leakage prevention system according to Embodiment 1 of the present invention.

FIG. 10 is a sequence chart showing operation at the time of the third authentication processing in the sensitive information leakage prevention system according to Embodiment 1 of the present invention. As shown in FIG. 10, step S13 shown in FIG. 6 is constituted by steps S1301 to S1308.

As shown in FIG. 10, initially, the authentication requesting unit 109 in the client device generates a challenge code 5 and transmits the generated challenge code 5 to the authentication determination unit 209 (step S1301). The challenge code 5 may be the data transmitted from the server device 200 in step S11, for example. The challenge code 5 may also be a random number generated by the application in the client device.

Next, the authentication determination unit 209, upon receiving the challenge code 5 transmitted from the authentication requesting unit 109, stores the received challenge code 5. Then, the authentication determination unit 209 determines whether or not the challenge code 5 satisfies a set condition, e.g., determines whether or not the challenge code 5 matches the response code transmitted in step S1108. If a result of the determination is that the challenge code 5 satisfies the condition, the authentication determination unit 209 generates a response code and transmits the response code to the authentication requesting unit 109 (step S1302). Note that the response code in this case may also be a response code similar to that in step S902.

Next, the authentication requesting unit 109 checks the received response code (step S1303). Then, if a result of the check is that there is no problem, the authentication requesting unit 109 transmits a challenge code 6 to the authentication determination unit 209 (step S1304). Note that in Embodiment 1, the challenge code 5 transmitted in step S1301 and the challenge code 6 transmitted in step S1304 are the same code.

Next, the authentication determination unit 209 compares the challenge code 5 received in step S1302 with the newly received challenge code 6, and checks whether or not the two challenge codes match each other (step S1305).

If a result of the check in step S1305 is that the two challenge codes match, the authentication determination unit 209 registers "authenticated" in the authentication status column in the corresponding record in the authenticated client list (see FIG. 5) (step S1306).

Next, if the authentication is successful, the authentication determination unit 209 transmits the challenge code 6 received in step S1305 to the server application 204 (step S1307).

Next, the server application 204 transmits the response code to the client device 100 (step S1308). Thus, step S13 shown in FIG. 6 ends. Note that the response code in step S1308 may be the same as the response code used in step S1302, or may be a separately created response code.

As described above, in Embodiment 1, access control in accordance with the labels is processed within a client, and accordingly addition of the labels to packets can be omitted, and an MLS system that is applicable to a network can be provided without modifying the OS. Furthermore, since the routers 401 and 403 can be used in the network in Embodiment 1, the range of application of Embodiment 1 can be extended to an environment that requires address conversion and port conversion. In addition, since the functions of the routers can be utilized, saving of IP address resources can also be anticipated.

In the above-described example, only the authentication determination unit 209 in the server device holds the authenticated client list (see FIG. 5). However, in Embodiment 1, the authentication requesting unit 109 in the client device may hold an authenticated server list (see FIG. 11) in which IP addresses and names of authenticated servers are registered. In this case, the client device 100 can omit processing for authentication and the like when communicating with a server device registered in the authenticated server list, and accordingly the speed of communication between the client device and the server device can be increased. FIG. 11 is a diagram showing an exemplary authenticated server list used in Embodiment 1 of the present invention.

In Embodiment 1, when the authentication determination unit 209 in the server device 200 permits access by the client device 100, the authentication determination unit 209 can set a time period (valid time) during which access is permitted, and registers the valid time in the authenticated client list.

FIG. 12 is a diagram showing another exemplary authenticated client list according to Embodiment 1 of the present invention. In the authenticated client list shown in FIG. 12, the time (remaining valid time) during which authentication is valid is registered, unlike the authenticated client list shown in FIG. 5.

After the valid time has elapsed, the authentication determination unit 209 does not permit access by the client device 100. Specifically, the authentication determination unit 209 reduces the valid time every second, and when the valid time reaches 0, the authentication determination unit 209 deletes the entry of the client device whose valid time has become 0 from the authenticated client list.

Furthermore, the authentication determination unit 209 may perform the authentication processing again before the valid time reaches 0, and reset the valid time for authentication. In this case, since authentication is performed every fixed time interval, an authorized client device 100 and server device 200 are prevented from being replaced with an unauthorized client device and server device.

In the authenticated client list (see FIG. 5) of the authentication determination unit 209 and the authenticated server list (see FIG. 11) of the authentication requesting unit 109, the port number that is used by an application in a client device may also be registered in addition to the client IP address. In this case, after the application ends and network connection is canceled, the authentication determination unit 209 deletes the entry from the authenticated client list, based on the port number. Similarly, the authentication requesting unit 109 deletes the entry from the authenticated server list, based on the port number. In this mode, the above-described re-authentication is performed only while the application performs communication, and accordingly unnecessary re-authentication can be avoided.

A first program according to Embodiment 1 may be any program that for causes a computer to execute steps S1 to S8, S10, S12, and S14 shown in FIG. 6, steps S901, S903, and S904 shown in FIG. 8, steps S1101, S1103, and S1104 shown in FIG. 9. and steps S1301, S1303, and S1304 shown in FIG. 10. The client device 100 according to the present embodiment can be realized by installing this program in a computer and executing the program.

In this case, a CPU (Central Processing Unit) in the computer functions as the client program execution unit 101, the label assignment unit 104, the network access control unit 107, and the authentication requesting unit 109, and performs processing. In the present embodiment, a storage device such as a hard disk provided in the computer functions as the server information storing unit 108.

A second program according to the present embodiment may be any program that causes a computer to execute step S15 shown in FIG. 6, steps S902 and S905 to S907 shown in FIG. 8, steps S1102 and S1105 to S1107 shown in FIG. 9, and steps S1302 and S1305 to S1307 shown in FIG. 11. The server device 200 according to the present embodiment can be realized by installing this program in a computer and executing the program. In this case, a CPU (Central Processing Unit) in the computer functions as the server program execution unit 201 and the authentication determination unit 209, and performs processing.

Modification 1

Next, Modification 1 of Embodiment 1 will be described. Although two kinds of label, namely the sensitive label and the general label have been described in the above example, two or more kinds of label may be used in Modification 1. For example, four kinds of label, such as "sensitive", "strictly confidential", "confidential", and "not classified", may be assigned to applications and folders. In this case, the network access control unit 107 prohibits distribution of information from applications and folders having a label at a lower security level to applications and folders having a label at a higher security level, as in a general MLS system.

Modification 2

Next, Modification 2 of Embodiment 1 will be described. In step S7 shown in FIG. 6, the network access control unit 107 only permits network access of the application whose network access has been hooked. However, in Modification 2, the network access control unit 107 can execute encryption of transmitted/received data and recording of logs, in accordance with the labels. In this case, a system that can control security functions in accordance with the security level will be provided.

Modification 3

In the above-described example, reading from and writing to folders are controlled. However, in Modification 3, control of functions other than reading from and writing to folders is executed. For example, the authentication determination unit 209 can also control transmission to and reception from addresses of e-mails transmitted from the client device 100, rather than folders. Furthermore, the authentication determination unit 209 may control communication with processes of a server.

Modification 4

In the above-described example, the content of the authentication requesting server list 702 managed by the network access control unit 107 and the content of the folder label list 701 managed by the server information storing unit 108 are fixed. In contrast, in Modification 4, the authentication requesting server list 702 and the folder label list 701 are defined for each user. The authentication requesting server list 702 and the folder label list 701 are switched in accordance with the user who logs in to the client device 100. According to Modification 4, access control in accordance with the user is allowed.

Modification 5

In the case where the control target protocol is TCP/IP, the data used for authentication in steps S9, S11, and S13 shown in FIG. 6 may be a sequence number used in the TCP/IP protocol. In this case, security is enhanced, and accordingly three times that authentication had to be performed can be reduced to one time, resulting in an increase in the processing speed.

Embodiment 2

Figure 13:
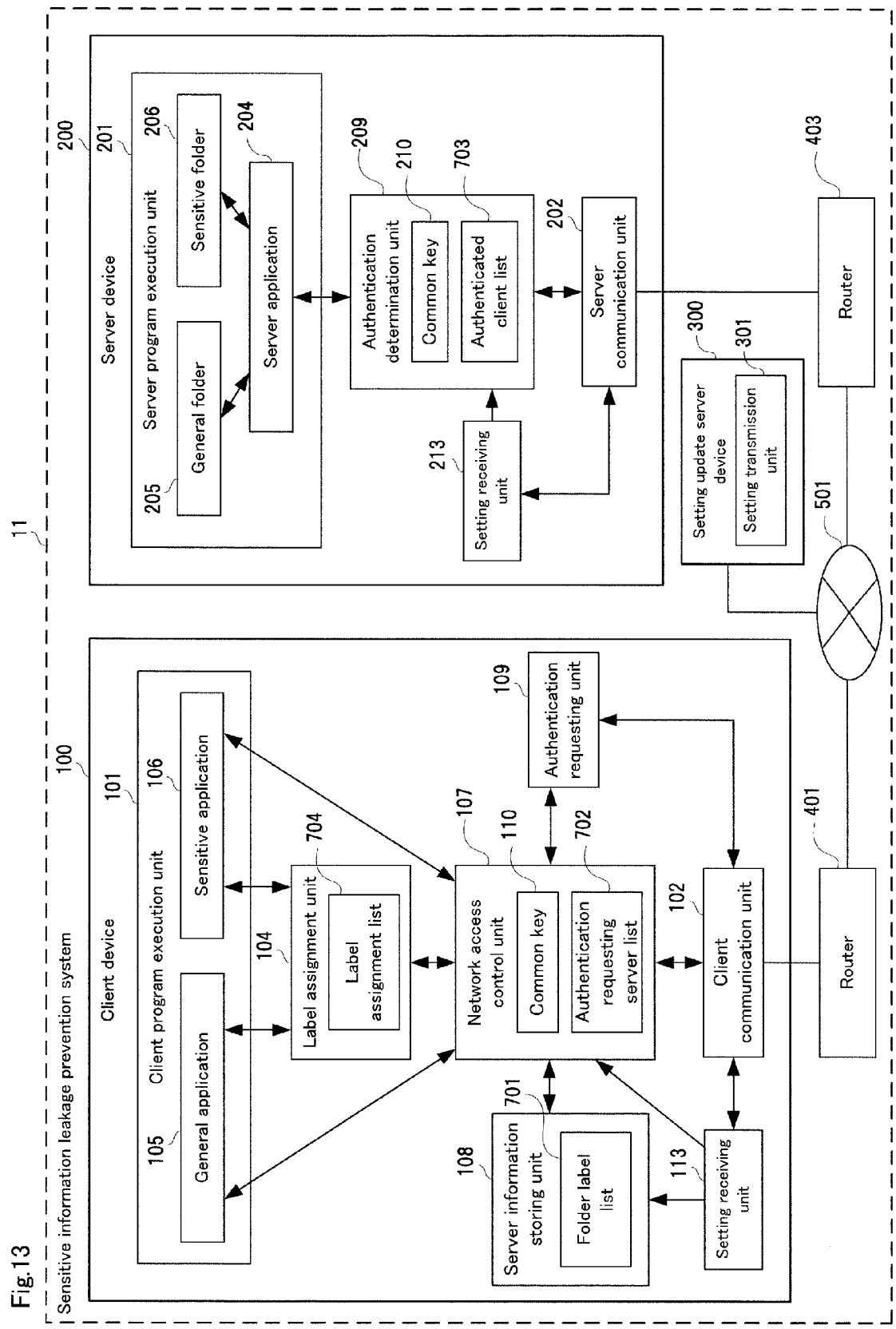
FIG. 13 is a block diagram showing a configuration of a sensitive information leakage prevention system according to Embodiment 2 of the present invention.

Next, a sensitive information leakage prevention system, a sensitive information leakage prevention method, and a program according to Embodiment 2 of the present invention will be described with reference to FIG. 13. FIG. 13 is a block diagram showing a system configuration of the sensitive information leakage prevention system according to Embodiment 2 of the present invention.

As shown in FIG. 13, a sensitive information leakage prevention system 11 according to Embodiment 2 includes a setting update server device 300, as well as the client device 100 and the server device 200. The client device 100 further includes a setting receiving unit 113. The server device 200 includes a setting receiving unit 213. Note that other features of the sensitive information leakage prevention system 11 in Embodiment 2 are configured similarly to the sensitive information leakage prevention system 10 shown in FIG. 1.

In Embodiment 2, the setting update server device 300 includes a setting transmission unit 301. The setting transmission unit 301 updates various lists, common keys to be used, and the like in the client device 100 and the server device 200.

Specifically, the setting transmission unit 301 holds the folder label list 701 stored in the server information storing unit 108, and the authentication requesting server list 702 and the common key 110 that are held in the network access control unit 107. The setting transmission unit 301 also holds the common key 210 that is held by the authentication determination unit 209 in the server device 200.

The setting transmission unit 301 transmits the folder label list 701, the authentication requesting server list 702, and the common key 110 to the setting receiving unit 113 in the client device. The setting transmission unit 301 transmits the common key 210 to the setting receiving unit 213 in the server device 200.

In the client device 100, the setting receiving unit 113, upon receiving information from the setting transmission unit 301, updates part or all of the folder label list 701, the authentication requesting server list 702, and the common key 110, based on the received information. In the server device 200, the setting receiving unit 213, upon receiving information from the setting transmission unit 301, updates the common key 210 based on the received information.

Thus, according to Embodiment 2, the folder label list 701, the authentication requesting server list 702, and the common keys 110 and 210 can be updated remotely. According to Embodiment 2, when there are a plurality of client devices 100 and server devices 200, management efficiency can be improved.

Note that a sensitive information leakage prevention method according to Embodiment 2 is implemented by operating the sensitive information leakage prevention system 11 according to Embodiment 2. A program according to Embodiment 2 is the same as the program described in Embodiment 1.

Figure 14:
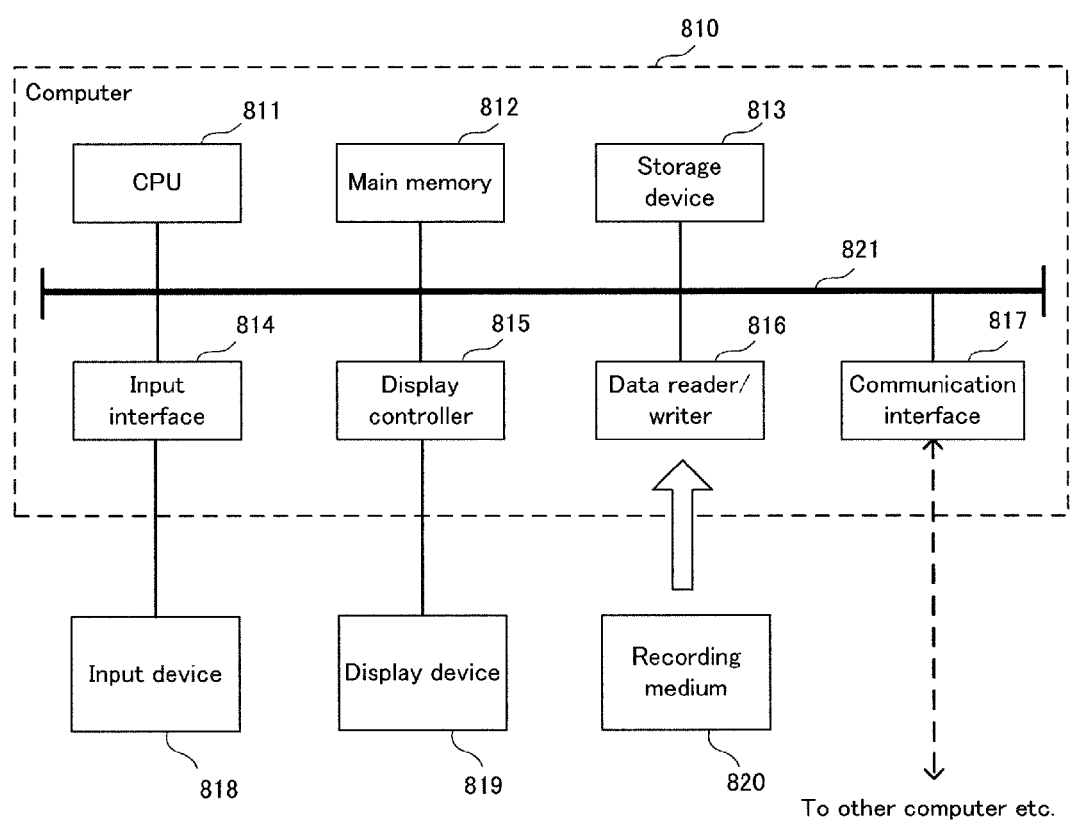
FIG. 14 is a block diagram showing an exemplary computer that realizes a client device and a server device according to Embodiments 1 and 2 of the present invention.

A computer that realizes the client device 100 and the server device 200 by executing the program according to Embodiments 1 and 2 will now be described using FIG. 14. FIG. 14 is a block diagram showing an exemplary computer that realizes the client device and the server device according to Embodiments 1 and 2 of the present invention.

As shown in FIG. 14, a computer 810 includes a CPU 811, a main memory 812, a storage device 813, an input interface 814, a display controller 815, a data reader/writer 816, and a communication interface 817. These units are connected to each other in a manner that enables data communication, via a bus 821.

The CPU 811 executes various types of operations by expanding the program (codes) according to the embodiments stored in the storage device 813 in the main memory 812 and executing these codes in a predetermined order. The main memory 812, typically, is a volatile storage device such as a DRAM (Dynamic Random Access Memory).

The program according to the embodiments may be provided in a state of being stored in a computer-readable recording medium 820, or may be provided via the Internet connected through the communication interface 817.

A semiconductor storage device such as a flash memory or the like is given, in addition to a hard disk, as a specific example of the storage device 813. The input interface 814 mediates data communication between the CPU 811, and an input device 818 such as a keyboard or a mouse. The display controller 815 is connected to the display device 819, and controls display on the display device 819.

The data reader/writer 816 mediates data communication between the CPU 811 and the recording medium 820, and executes reading out of programs from the recording medium 820 and writing of the results of processing by the computer 810 to the recording medium 820. The communication interface 817 mediates data communication between the CPU 811 and other computers.

A general-purpose semiconductor storage device such as CF (Compact Flash (registered trademark)) or SD (Secure Digital), a magnetic storage medium such as a flexible disk, or an optical storage medium such as CD-ROM (Compact Disk Read Only Memory) is given as a specific example of the recording medium 820.

The abovementioned embodiment is represented in full or in part by Notes 1 to 16 described below, but is not limited to the following description.

(Note 1)

A sensitive information leakage prevention system for preventing leakage of sensitive information between a client device and a server device, including:

a client device configured to execute an application program; and a server device configured to hold data to be used by the application program, wherein the client device determines whether or not access by the application program is allowed, based on a security level that is set for the application program and a security level that is provided to data held in the server device, and transmits, if it is determined that access is allowed, a challenge code that is generated using packet data from the application program to the server device and requests authentication, and the server device transmits, when the challenge code is transmitted thereto, a preset response code to the client device, determines that authentication is successful if the server device receives a set response to the response code from the client device, and thereafter permits access by the client device.

(Note 2)

The sensitive information leakage prevention system according to Note 1, wherein the server device transmits the response code if the transmitted challenge code satisfies a set condition, and thereafter determines that authentication is successful when the same code as the challenge code is received from the client device.

(Note 3)

The sensitive information leakage prevention system according to Note 2, wherein the server device causes the client device to transmit a challenge code with a different content multiple times, and permits access by the client device if it is determined that authentication is successful for each challenge code.

(Note 4)

The sensitive information leakage prevention system according to any of Notes 1 to 3, wherein the server device registers a client device whose access is permitted in an authenticated client list, and rejects access by a client device that is not registered in the authenticated client list.

(Note 5)

The sensitive information leakage prevention system according to Note 4, wherein the server device sets a time period during which access is permitted when access by the client device is permitted, registers the set time period in the authenticated client list, and thereafter does not permit access by the client device after the time period has elapsed.

(Note 6)

The sensitive information leakage prevention system according to any of Notes 1 to 5, wherein both the client device and the server device have a common key, the client device transmits the challenge code that has been encrypted with the common key, and the server device transmits the response code that has been encrypted with the common key.

(Note 7)

A client device that accesses data held in a server device, including:

a network access control unit configured to determine whether or not access by an application program used in the client device is allowed, based on a security level that is set for the application program and a security level that is provided to data held in the server device; and an authentication requesting unit configured to transmit, if it is determined that access is allowed, a challenge code that is generated using packet data from the application program to the server device, and request authentication.

(Note 8)

A server device that determines whether or not a client device is allowed to access data to be used by an application program that is executed by the client device, including:

an authentication determination unit configured to transmit, if a challenge code generated using packet data from the application program is transmitted for requesting authentication from the client device, a preset response code to the client device, and thereafter determine, if a set response to the response code is received from the client device, that authentication is successful and permit access by the client device.

(Note 9)

A method for preventing leakage of sensitive information between a client device that executes an application program and a server device that holds data to be used by the application program, the method including:

a step (a) of the client device determining whether or not access by the application program is allowed, based on a security level that is set for the application program and a security level that is provided to the data held in the server device;

a step (b) of the client device transmitting, if it is determined that access is allowed, a challenge code that is generated using packet data from the application program to the server device and requesting authentication;

a step (c) of the server device transmitting, when the challenge code is transmitted thereto, a preset response code to the client device, and determining that authentication is successful if a set response to the response code is received from the client device; and a step (d) of the server device permitting access by the client device if it is determined that authentication is successful.

(Note 10)

The sensitive information leakage prevention method according to Note 9, wherein in the step (c), if the transmitted challenge code satisfies a set condition, the server device transmits the response code, and thereafter determines that authentication is successful when the same code as the challenge code is transmitted from the client device.

(Note 11)

The sensitive information leakage prevention method according to Note 10, wherein the step (b) and the step (c) are executed multiple times using a challenge code with a different content, and if it is determined in each step (c) that authentication is successful, access by the client device is permitted in the step (d).

(Note 12)

The sensitive information leakage prevention method according to any of Notes 9 to 11, wherein in the step (d), the server device registers a client device whose access is permitted in an authenticated client list, and rejects access by a client device that is not registered in the authenticated client list.

(Note 13)

The sensitive information leakage prevention method according to Note 12, wherein in the step (d), the server device sets a time period during which access is permitted when access by the client device is permitted, registers the set time period in the authenticated client list, and thereafter does not permit access by the client device after the time period has elapsed.

(Note 14)

The sensitive information leakage prevention method according to any of Notes 9 to 13, wherein both the client device and the server device have a common key, in the step (b), the client device transmits the challenge code that has been encrypted with the common key, and in the step (c), the server device transmits the response code that has been encrypted with the common key.

(Note 15)

A computer-readable recording medium storing a program for accessing, by a computer, data held in a server device, the program containing a command for causing the computer to execute:

a step (a) of determining whether or not access by the application program is allowed, based on a security level that is set for the application program used in the computer and a security level that is provided to the data held in the server device; and a step (b) of transmitting, if it is determined in the step (a) that access is allowed, a challenge code that is generated using packet data from the application program to the server device and requesting authentication.

(Note 16)

A computer-readable recording medium storing a program for determining, by a computer, whether or not a client device is allowed to access data to be used by an application program that is executed by the client device, the program containing a command for causing the computer to execute:

a step (a) of transmitting a preset response code to the client device if a challenge code that is generated using packet data from the application program is transmitted for requesting authentication from the client device;

a step (b) of determining that authentication is successful if a set response to the response code is received from the client device after the step (a) is executed; and a step (c) of permitting access by the client device if it is determined in the step (b) that authentication is successful.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority of the prior Japanese Patent Application No. 2011-263621 filed on Dec. 1, 2011, the entire contents of which are incorporated herein by reference.

INDUSTRIAL APPLICABILITY

As described above, according to the present invention, network access can be controlled between a client device and a server device in accordance with a security level, without modifying the operating system. The present invention is useful for preventing information leakage in a computer network.

DESCRIPTIONS OF REFERENCE NUMERALS

100 Client device
101 Client program execution unit
104 Label assignment unit
107 Network access control unit
108 Server information storing unit
109 Authentication requesting unit
113 Setting receiving unit
200 Server device
201 Server program execution unit
209 Authentication determination unit
213 Setting receiving unit
300 Setting update server device
301 Setting transmission unit
401, 403 Router
501 Network
810 Computer
811 CPU
812 Main memory
813 Storage device
814 Input interface
815 Display controller
816 Data reader/writer
817 Communication interface
818 Input device
819 Display device
820 Recording medium
821 Bus

The invention claimed is:

1. A sensitive information leakage prevention system for preventing leakage of sensitive information between a client device and a server device, comprising:
a client device realized by a computer and configured to execute an application program; and
a server device realized by a computer and configured to hold data to be used by the application program,
wherein a processor of the client device the client device determines whether or not access by the application program is allowed, based on a security level that is set for the application program and a security level that is provided to data held in the server device, and transmits, if it is determined that access is allowed, a challenge code that is generated using packet data from the application program to the server device and requests authentication, and
a processor of the server device transmits, when the challenge code is transmitted thereto, a preset response code to the client device, determines that authentication is successful if the server device receives a set response to the response code from the client device, and thereafter permits access by the client device,
wherein the client device assigns a label that indicates a preset security level to each of a plurality of application programs including the application program,
wherein the client device monitors network access by the application programs, and upon network access by an application program having begun, determines s allowed in accordance the label assigned to the application program and a label of an access destination folder,
wherein the server devices performs authentication processing with the client device in which access control is performed in accordance with the labels,
and wherein the server device performs no authentication processing with the client device in which access control cannot be performed in accordance with the client device, such that all network communication is prohibited.

2. The sensitive information leakage prevention system according to claim 1,
wherein the server device transmits the response code if the transmitted challenge code satisfies a set condition, and thereafter determines that authentication is successful when the same code as the challenge code is received from the client device.

3. The sensitive information leakage prevention system according to claim 2,
wherein the server device causes the client device to transmit a challenge code with a different content multiple times, and permits access by the client device if it is determined that authentication is successful for each challenge code.

4. The sensitive information leakage prevention system according to claim 1,
wherein the server device registers a client device whose access is permitted in a list, and rejects access by a client device that is not registered in the list.

5. The sensitive information leakage prevention system according to claim 4,
wherein the server device sets a time period during which access is permitted when access by the client device is permitted, registers the set time period in the list, and thereafter does not permit access by the client device after the time period has elapsed.

6. The sensitive information leakage prevention system according to claim 1,
wherein both the client device and the server device have a common key,
the client device transmits the challenge code that has been encrypted with the common key, and
the server device transmits the response code that has been encrypted with the common key.

7. A method for preventing leakage of sensitive information between a client device that executes an application program and a server device that holds data to be used by the application program, the method comprising:
- a step (a) of the client device determining whether or not access by the application program is allowed, based on a security level that is set for the application program and a security level that is provided to the data held in the server device;
- a step (b) of the client device transmitting, if it is determined that access is allowed, a challenge code that is generated using packet data from the application program to the server device and requesting authentication;
- a step (c) of the server device transmitting, when the challenge code is transmitted thereto, a preset response code to the client device, and determining that authentication is successful if a set response to the response code is received from the client device; and
- a step (d) of the server device permitting access by the client device if it is determined that authentication is successful,
- wherein a processor of the client device performs steps (a) and (b), and a processor of the server device perform steps (c) and (d),
- wherein the client device assigns a label that indicates a preset security level to each of a plurality of application programs including the application program,
- wherein the client device monitors network access by the application programs, and upon network access by an application program having begun, determines s allowed in accordance the label assigned to the application program and a label of an access destination folder,
- wherein the server devices performs authentication processing with the client device in which access control is performed in accordance with the labels,
- and wherein the server device performs no authentication processing with the client device in which access control cannot be performed in accordance with the client device, such that all network communication is prohibited.

8. A non-transitory computer-readable recording medium storing a program for accessing, by a computer, data held in a server device, the program containing a command for causing the computer to execute:
- a step (a) of determining whether or not access by the application program is allowed, based on a security level that is set for the application program used in the computer and a security level that is provided to the data held in the server device; and
- a step (b) of transmitting, if it is determined in the step (a) that access is allowed, a challenge code that is generated using packet data from the application program to the server device and requesting authentication.

9. A non-transitory computer-readable recording medium storing a program for determining, by a computer, whether or not a client device is allowed to access data to be used by an application program that is executed by the client device, the program containing a command for causing the computer to execute:
- a step (a) of transmitting a preset response code to the client device if a challenge code that is generated using packet data from the application program is transmitted for requesting authentication from the client device;
- a step (b) of determining that authentication is successful if a set response to the response code is received from the client device after the step (a) is executed; and
- a step (c) of permitting access by the client device if it is determined in the step (b) that authentication is successful,
- wherein the client device assigns a label that indicates a preset security level to each of a plurality of application programs including the application pro rg am,
- wherein the client device monitors network access by the application programs, and upon network access by an application program having begun, determines s allowed in accordance the label assigned to the application program and a label of an access destination folder,
- wherein the server devices performs authentication processing with the client device in which access control is performed in accordance with the labels,
- and wherein the server device performs no authentication processing with the client device in which access control cannot be performed in accordance with the client device, such that all network communication is prohibited.

* * * * *